United States Patent Office
3,409,417
Patented Nov. 5, 1968

3,409,417
METAL BONDED SILICON NITRIDE
Paul C. Yates, Wilmington, Del., assignor to E. I. du Pont de Nemours and Company, Wilmington, Del., a corporation of Delaware
No Drawing. Continuation-in-part of applications Ser. No. 371,757 and Ser. No. 371,777, June 1, 1964. This application Oct. 19, 1966, Ser. No. 587,671
9 Claims. (Cl. 29—182.5)

ABSTRACT OF THE DISCLOSURE

Dense, refractory compositions of silicon nitride and a pressing adjuvant bonded with iron, cobalt, nickel, chromium, rhenium, tungsten, molybdenum or their alloys, are useful as strong, hard, cutting tips. Up to one half of the silicon nitride can be replaced with other chemically stable refractory nitrides, carbides, aluminates, chromites, oxides and silicides without adversely affecting the cutting tips.

CROSS-REFERENCE TO RELATED APPLICATIONS

This application is a continuation-in-part of my copending application Ser. No. 371,777, filed June 1, 1964, now abandoned and my copending application Ser No. 371,757, filed June 1, 1964 now abandoned.

This invention relates to refractory compositions and is more particularly directed to silicon nitride interdispersed with iron, cobalt, nickel, chromium, rhenium, molybdenum, tungsten, and their alloys and a compound, hereinafter referred to as a pressing adjuvant, which is selected from among magnesium nitride, lithium nitride, aluminum oxide, magnesium oxide, silica, boric oxide, and the oxide spinels which consist of a divalent oxide such as magnesium oxide, iron oxide, cobalt oxide, and nickel oxide when present in conjunction with a trivalent oxide such as aluminum oxide, iron oxide and chromic oxide provided that the divalent and trivalent oxide shall not be of the same metal. The invention is further directed to the preparation of these interdispersions and to their use as high temperature refractories and cutting tools.

The refractory interdispersions of this invention are exceptionally hard and strong, and display outstanding resistance to chemicals, thermal shock, impact, and high temperatures. Accordingly, they can be used in the numerous ways in which refractory materials are conventionally used. Further, in the form of tool bits and cutting tools, these interdispersions display great resistance to wear, great resistance to cratering, and are resistant to welding to work pieces being cut even at high speeds.

The term "interdispersion" as used herein describes a relationship of the constituents and is meant to include traditional dispersions in which there is a dispersed particulate phase and a dispersant continuous phase. It is also meant to include simple mixtures in which the phases are particulate or interrupted and homogeneously intermixed as well as those mixtures in which there are two or more phases and some or all of them are continuous and interpenetrating.

According to the present invention I have discovered that a homogeneous interdispersion of fine particles of a pressing adjuvant and silicon nitride in iron, cobalt, nickel, molybdenum, tungsten, chromium, rhenium, or their alloys in a manner such that the pressing adjuvant, the silicon nitride and the metal are mutually dispersed in relation to one another, provides a refractory interdispersion possessing exceptional properties.

The metals suitable for use in the interdispersions of this invention are iron, cobalt, nickel, molybdenum, tungsten, chromium, rhenium and their alloys with one another. Also minor amounts of other conventional alloying agents can be used with these metals as is more fully explained hereinafter.

These metals with the requisite degree of purity can be obtained from commercial sources or they can be prepared in a conventional manner. A suitable method of preparation and purification is fully set forth hereinafter.

The silicon nitride to be used in the interdispersions of this invention can be prepared in any conventional manner such as by nitriding silicon metal powder. The silicon nitride can be used alone or in mixtures with other stable refractory compounds. Preparation of silicon nitride and suitable refractory additives and the criteria for their selection are described in full hereinafter.

The other compounds required for use in the interdispersions of this invention are called pressing adjuvants. By "pressing adjuvant" is meant an agent which aids or promotes pressing. The pressing adjuvants suitable for use in the interdispersions of this invention are such refractory compounds as magnesium nitride, lithium nitride, aluminum oxide, magnesium oxide, silica, boric oxide, and the oxide spinels which consist of a divalent oxide such as magnesium oxide, iron oxide, cobalt oxide and nickel oxide associated in approximately equal molar quantities with a trivalent oxide such as aluminum oxide, iron oxide, and chromic oxide with the proviso that the divalent and trivalent oxide shall not be of the same metal. These compounds can be obtained from ordinary commercial sources with the requisite degree of purity.

The interdispersions of this invention are prepared by intimatelyi ntermixing silicon nitride and a pressing adjuvant in the form of very fine particles, with the metal to be used, also in the form of very fine particles, until a homongeneous interdispersion is obtained. This homogeneous powder can then be heated and pressed into the desired form and to the desired degree of density. Methods of preparing the powder interdispersions and refractory interdispersions are more fully discussed hereinafter.

The preparation of the powder interdispersions is very important because the outstanding properties of the refractory interdispersions formed therefrom depend to a large degree on the composition of the powder. For example, the homogeneity of the interdispersion of metal, pressing adjuvant and nitride, the ultimate particle and crystal size of the nitride, pressing adjuvant and metal, and the proportional amounts of pressing adjuvant, metal and nitride are important in achieving the desired properties in the refractory interdispersions of this invention and are largely determined by the powder which is used to form the refractory dispersion.

The particle size of the metal, pressing adjuvant and silicon nitride being incorporated into the powder interdispersions of this invention should be as small as is practicable and the preferred maximum particle size is about fifty microns. However, as the desired homogeneity of interdispersion is much easier to attain as the particle size decreases, it is advantageous for the components to have an average particle size of less than ten microns.

If the interdispersed powders are to be used to form very strong refractories like cutting tools and bits, it is preferred that the average particle size of the components be smaller than one micron. Such a particle size adds significantly to the degree of strength, toughness and wear resistance obtainable in the refractory interdispersions of this invention and necessary for the use of such compositions as cutting tools.

Refractory dispersions of this invention can be formed from powdered interdispersions of silicon nitride, pressing adjuvant and metal wherein there is from about one to about ninety-eight parts by volume of nitride per part of metal. If the amount of silicon nitride in a powder is below one part by volume per part of metal, the hardness of a refractory interdispersion made therefrom is less than that which is desired. Amounts of silicon nitride in the powders above ninety-eight parts per part of metal tend to lessen significantly the impact strength of refractories made therefrom.

A preferred amount of silicon nitride in the powder interdispersions of this invention is between about 1.5 and 19 parts by volume per part of metal when the metal is molybdenum, tungsten, chromium and rhenium, and between about 3 and about 50 parts by volume per part of metal when the metal is iron, cobalt or nickel. Restricting the amount of silicon nitride to less than about 19 and 50 parts by volume respectively increases the probability of continuity of the metal within the refractory interdispersion to be formed, and in turn, the probability of outstanding impact resistance, strength, and toughness. Conversely, the presence of at least 1.5 and 3 parts of silicon nitride by volume repsectively, per part of metal in the powder, insures a hardness, wear resistance, and chemical resistance in a refractory interdispersion made therefrom which makes it very desirable for such refractory uses as cutting tools and bits.

The amounts of pressing adjuvant in the powdered interdispersions of this invention will range from about 0.02 part to about 10 parts by volume per part by volume of metal. If the amount of pressing adjuvant is below about 0.02 part by volume per part of metal, it is very difficult to obtain the desired degree of density in a refractory interdispersion made therefrom at sufficiently low temperatures to avoid thermal decomposition of the silicon nitride. Amounts of pressing adjuvant greater than about 10 parts by volume per part by volume of metal impart little significant advantage to a refractory interdispersion and are therefore unnecessary.

A preferred amount of pressing adjuvant in the powder interdispersions of this invention is between about 0.06 part and about 7.0 parts by volume per part of metal. The presence of at least 0.06 part by volume of pressing adjuvant per part of metal in a powder interdispersion insures that a degree of density can be obtained in a refractory interdispersion made therefrom which greatly enhances its utility. Restricting the amount of pressing adjuvant to less than about 7 parts by volume per part of metal contributes to a probability that the metal will be continuous in a refractory interdispersion made therefrom.

One of the preferred embodiments of this invention is a powder interdispersion in which the silicon nitride particles and particles of the pressing adjuvant are separated from like particles by particles of the metal. This tends to decrease agglomeration or aggregation of the discrete silicon nitride particles and aids or increases compaction of the components during fabrication of refractory interdispersions of the invention.

The term "discrete" as used above and as will be used hereinafter means individually distinct or composed of distinct parts.

Another preferred embodiment of this invention is an interdispersion in which discrete particles of silicon nitride and pressing adjuvant particles are uniformly dispersed in the metal which is present as a continuous matrix separating the discrete particles. Such a distribution of the metal ordinarily provides greatly improved mechanical properties in a refractory interdispersion, making it very desirable for uses such as cutting tools and bits.

Still another preferred embodiment of this invention is a solid interdispersion in which there is a limited degree of interconnection into a continuous matrix, or three-dimensional network, of the principal phases of the invention. Such a structure is one in which both the silicon nitride phase and the metal phase are co-continuous with an interpenetrating network of each phase being simultaneously present. Such compositions exhibit most outstanding properties when the individual crystallites of the interpenetrating networks, although connected to one another, are quite small and distinguishable and thus discrete.

However, it must be noted that a distribution of the components such as described in the preceding paragraphs is not essential to this invention since outstanding refractories can be produced in the absence of such a state of distribution.

It is desirable that the silicon nitride, the pressing adjuvant and the metal used all possess a high degree of chemical purity. In particular, it is desirable to avoid the presence in any component of such chemicals as oxygen, nitrogen, boron, sulfur and silicon, either in uncombined form or as compounds having a lower free energy of formation per atom than the corresponding oxides, nitrides, silicides, borides or sulfides of molybdenum, tungsten, chromium, rhenium, iron, cobalt or nickel. Other such elements or compounds in a form and in amounts which would react with or dissolve in the metal used during fabrication of the refractory interdispersion in such a manner so as to cause undesirable brittleness of the metal, should likewise be avoided. Examples of such impurities which should be avoided are nickel oxide, iron oxide, cobalt oxide, chromium oxide and large amounts of free carbon.

Minor amounts of alloying agents conventionally used with molybdenum, tungsten, chromium, rhenium, iron, cobalt, and nickel, can be used in the dispersions of this invention so long as they are retained as a homogeneous solution with the metal, having the crystal structure of the metal. Such elements as chromium, tungsten, molybdenum, manganese and others can be used in iron, cobalt and nickel in amounts not exceeding 30% by weight of the iron, cobalt or nickel. Molybdenum, tungsten, and chromium in amounts up to about 20% by weight of the iron, cobalt or nickel are preferred to form a metal binder of exceptional toughness.

When extreme hardness is desired in the metal binder, elements such as aluminum, titanium, boron, and silicon can be used in amounts of up to 5% by weight of iron, cobalt or nickel, and carbon can be used in amounts of up to about 1% by weight of these metals. However, larger amounts of such elements should be avoided to prevent the metal from combining therewith to form compounds such as borides, carbides, silicides, etc., which would leave the metal undesirably brittle.

Generally speaking, amounts of alloying agents which would form intermetallic compounds or new crystallographic phases should be avoided. Allowable percentages of such agents can be determined, according to this criteria, by consulting appropriate phase diagrams in standard metallurgical texts.

Amounts of iron of up to 10% in tungsten and up to 30% in chromium can be used. Small percentages of iron, titanium, and zirconium can be used in molybdenum and smaller amounts of nickel or cobalt can be used in molybdenum, tungsten, chromium and rhenium.

Chemically stable refractory compounds can be used to replace the silicon nitride in the interdispersions of this invention in amounts of less than 50% by volume of the silicon nitride. Such nitrides as aluminum nitride, uranium nitride, titanium nitride, zirconium nitride, tantalum nitride, hafnium nitride, boron nitride, beryllium nitride, cerium nitride and thorium nitride, can be used to replace a part of the silicon nitride. Such stable carbides as titanium carbide, zirconium carbide, tungsten carbide, molybdenum carbide, chromium carbide, tantalum carbide, niobium carbide and hafnium carbide, the aluminates and chromites of zirconium, magnesium, calcium, barium and strontium and the silicides and disilicides of chromium, molybdenum and tungsten can be used in similar amounts. In a similar fashion the more chemically stable borides such as titanium and zirconium monoboride and the refractory oxides of zirconium, hafnium, titanium, chromium, beryllium, zinc, calcium, thorium, barium, strontium, cerium and the rare earths can also be used as partial replacements for the silicon nitride.

It is essential, however, that the silicon nitride always make up more than 50% of the non-metal components in the dispersions of this invention. It is also essential, as previously mentioned, that refractory compounds not be used which will react with the metal in such a manner so as to embrittle it or which will break down to furnish elements whose presence cannot be tolerated for the same reason.

In general, the criteria to be followed in selecting additive compounds is that their melting point should exceed 1400° C., while their free energies of formation from their constituent elements is greater than the free energies of the compounds which would be formed by disproportionation of the additive compound and reaction of its constituent elements with the bonding metal.

PREPARATION OF THE METALS

As stated previously, the metals which can be used in the dispersions of this invention are molybdenum, tungsten, chromium, rhenium, iron, cobalt, nickel, and their alloys. A suitable method of preparation of these metals for incorporation into the interdispersions of this invention is hydrogen reduction of the corresponding metal oxide or carbonate at a temperature of from about 600° C. to about 1200° C.

In the preparation of the metals to be used in this invention, it is best to employ as low a temperature as is consistent with a reasonably rapid completion of reduction. This is done to prevent excessive sintering and agglomeration of the particles of metal being formed. For molybdenum and tungsten it is preferred to use a two-stage reduction. Thus the oxide is first reduced to a lower valent oxide such as the dioxide at a temperature below the oxide melting point such as 600° C. The reduction is then completed at an elevated temperature such as 900° C. which is low enough to avoid excessive sintering.

The reduction will be followed by milling operations in an inert liquid medium, and if necessary, with purification such as with hydrochloric acid. In this manner the pure metal can be obtained in a powder form, preferably having a specific surface area greater than one square meter per gram, which makes it convenient for its subsequent interdispersion with the silicon nitride. It is desirable that the grinding media used in the milling operations be constructed of the same metal as that being prepared so that a foreign material is not introduced by attrition of the grinding media.

PREPARATION OF SILICON NITRIDE

The silicon nitride to be used in this invention can be prepared by any conventional method such as by nitriding silicon metal powder, which has been milled to reduce its particle size to less than 10 microns, at a temperature of from 900° C. to 1600° C. in a gaseous atmosphere of nitrogen or cracked ammonia.

A preferred procedure is to first nitride the finely divided silicon metal for a period of from 1 to 5 hours at a temperature below about 1400° C., to prevent its melting. The temperature is then raised slowly to from 1450° C. to 1600° C. to complete the reaction above the melting point of silicon.

In the event that some aggregation occurs during the synthesis of the silicon nitride, it is possible to disaggregate the particles such as by ballmilling in an inert solvent.

Following the milling, it may be desirable to purify the nitride such as by acid treatment, to remove impurities picked up during the milling through attrition of the grinding media. To avoid the need for purification, it is preferred to use a grinding media such as the balls, of the same metal as that with which the nitride is eventually to be interdispersed.

If it is desired to achieve a very low oxygen level, the silicon nitride can be reduced in an atmosphere such as cracked ammonia to remove any oxygen picked up during the purification procedure.

PREPARATION OF THE POWDER INTERDISPERSIONS

The interdispersions of the metals with silicon nitride, pressing adjuvant, and other refractory compounds if desired, in the form of a powder, make up one of the preferred forms of this invention. The silicon nitride, pressing adjuvant and such other refractory compounds as may be desired, can be interdispersed with the metal powder in any convenient manner such as by mixing in a hydrocarbon solvent or acetone in a colloid mill or a ballmill. Ballmilling times of from 24 to 500 hours have been satisfactory.

Since the silicon nitride constituent of the invention is difficult to purify, it is desirable to employ grinding media, such as the balls, of the same metal as that with which the silicon nitride is being interdispersed. This insures that foreign materials will not be introduced as a result of the attrition of the grinding media. Alternatively, the mill can be one which is coated with an elastomeric material such as neoprene, which is not softened or attacked by the grinding fluid. Milling conditions, such as volume loading of the mill and rate of rotation, should be optimized as hereinafter illustrated in the examples.

After milling the mixture to homogeneity, the grinding fluid can be removed by washing with a suitable solvent such as hexane and drying under vacuum. A chemical analysis can be performed at this stage, and if appreciable quantities of oxygen, carbon, or nitrogen are combined with the metal in any form other than the stable refractory compounds mentioned previously, the powders can be reduced to remove such impurities. This reduction will preferably be performed below 1000° C. with very dry pure hydrogen.

The average size of the particles can readily be determined by examination of the interdispersed powders using a light microscope for larger particles and an electronmicroscope for smaller particles. By average particle size is meant the number average of the particle diameters. In the preferred powder dispersions the surface area per cubic centimeter of solids is from about 3 to about 180 square meters. The surface area per cubic centimeter can be determined by dividing the specific surface area, as measured by standard nitrogen absorption techniques, by the density of the solids in the interdispersion.

PREPARATION OF REFRACTORY INTERDISPERSIONS

The interdispersions of the metals with silicon nitride, pressing adjuvant and such other refractory compounds as may be desired, in the form of a solid, make up another preferred form of this invention. A representative method for forming these interdispersions is by pressing and heating the powder interdispersions to nearly theoretical density. The pressing and heating may be done sequentially as in cold pressing and sintering, or it may be done simultaneously as in hot pressing, hot extrusion, forging, or coining. The preferred method of fabrication is by hot pressing. It is also preferred to delay application of the pressure until goal temperature is reached and to conduct the operation in a vacuum or other inert atmosphere.

The pressing temperature will depend on the amount of metal employed, its state of subdivision, and the composition and state of subdivision of the silicon nitride. Generally speaking, the temperatures will be at least $9/10$ of the melting point, expressed in degrees Kelvin, of the metal component and should be at least 1000° C. for iron, cobalt and nickel and preferably between about 1400 and not more than 1900° C. for all the metals. The larger the amount of nitride and pressing adjuvant being used, and the lower the pressure being employed, the higher should be the fabrication temperature. When hot pressing is employed it is preferred to use a temperature of from about 1400° C. to about 1850° C.

The time the compact spends at the highest temperature used and under the full pressure employed will vary according to the temperature and method of fabrication used and the composition and state of interdispersion. Generally, the time will range from a few seconds in hot extrusion to 1 to 30 minutes in hot pressing and from 10 minutes to several hours when fabrication is by cold pressing and sintering.

The pressure employed will also vary according to the temperature and method of fabrication used and the composition and state of dispersion, but will in most instances range from 500 pounds per square inch to more than 6000 pounds per square inch.

The applicable combinations of pressing conditions will hereinafter be more completely illustrated in the examples.

An alternate method of interdispersing the components with one another, prior to preparation of a solid interdispersion, is to precipitate the metal to be used on previously prepared fine particles of silicon nitride and pressing adjuvant. The metal can be precipitated, for example, as a hydrous oxide or hydrous metal carbonate and the resulting homogeneous mixture can then be reduced in an atmosphere rich in both nitrogen and hydrogen, such as cracked ammonia. This allows the reduction of the oxides of the metals which are present without effecting a change in the silicon nitride being used.

After a refractory interdispersion has been prepared, the particle sizes of the components can be determined by making a metallographic section, etching the section with an appropriate chemical, and examining the surface with a microscope, using an optical microscope or an electronmicroscope, as is appropriate. Where an electronmicroscope is to be used, a conventional carbon or plastic replica of the surface is made first and the measurements are then made on the replica.

The average particle size of the components of a refractory interdispersion of this invention should be less than 50 microns. In the more preferred embodiments of this invention the average particle size will be less than 10 microns, and in the most preferred embodiments of the invention the average particle size will be less than one micron.

The nature of the interdispersion of the silicon nitride and pressing adjuvant with the metal and the dimensions of the metal in the refractory interdispersions of this invention will be a function of the fabrication conditions and the volume fraction employed as well as the nature of the starting material. Some clumping or aggregation of particles of silicon nitride and pressing adjuvant will occur, but as mentioned previously, one of the preferred embodiments of the invention is that in which most of the particles of silicon nitride and pressing adjuvant are separated from like particles by some of a continuous metal matrix giving a homogeneous and uniform interdispersion of discrete particles of silicon nitride and pressing adjuvant.

Also as stated previously, one of the most preferred embodiments of this invention is a refractory interdispersion in which there is a co-continuous network of very finely divided discrete crystallites of both the metallic phase and the silicon nitride particles, such crystallites having an average particle size of less than one micron.

More specifically, in its preferred aspects, it is desired that the homogeneity of interdispersion be such that the distribution of the silicon nitride, pressing adjuvant and metal in the refractory interdispersion is on a 1000 square micron scale, and more preferably on a 100 square micron scale. By this is meant that a metallographic or an electron micrographic scan, as conventionally used in metallurgy to examine the structure of alloys, will show pressing adjuvant, silicon nitride and metal present within a square region no greater than 32 microns on edge, and preferably no greater than 10 microns on edge. Moreover, in the most preferred embodiment of this invention each square region 10 microns on edge which is examined will exhibit substantially the same structural characteristics as every other such region in the interdispersion within conventional statistical distribution limits.

The presence of a continuous phase of the metal in preferred refractory dispersions of this invention can be most simply determined by measuring the electrical resistivity of the dispersion. Since silicon nitride is an excellent electrical insulator, if it is distributed so as to interrupt the continuity of the metal, the electrical resistivity of the refractory interdispersion will be exceedingly high. Conversely, if one of the metals is distributed as a continuous phase throughout a refractory interdispersion of this invention, the electrical resistivity of the interdispersion will be inversely proportional to the volume fraction and thickness of the continuous pathway of the metallic constituent. Appreciable continuity of the metal throughout a refractory dispersion of this invention is indicated by a specific electrical resistivity of less than about 10,000 ohm centimeters; in the preferred refractory dispersions the specific electrical resistivity will be less than about 500 ohm centimeters; and in the most preferred refractory interdispersions the specific electrical resistivity will be less than one ohm centimeter.

The refractory interdispersions of this invention have a density in excess of 90% of the theoretical density and preferably in excess of 95% of the theoretical density. Those refractory interdispersions which are to be put to such uses as cutting tools most preferably have a density in excess of 98% of the theoretical density and are substantially free from pores when examined by metallographic methods. The theoretical density is calculated by assuming that the specific volumes of the individual components are additive.

Then density of refractory interdispersions of this invention can be determined by any technique for determining the simultaneous weight and volume of the composite. Most simply the weight can be determined with a sensitive analytical balance and the volume can be determined by mercury or water displacement.

It should be understood that the previously discussed aspects of the structure, purity, density, homogeneity, and metal continuity of the refractory interdispersions of this invention are each contributing factors toward achieving improved properties in such interdispersions. However, the most outstanding refractories are obtained when all of the characteristics are simultaneously present. Such refractories, in the form of cutting tools or bits, constitute the most preferred embodiment of this invention.

Such a refractory composite is one in which discrete silicon nitride particles, discrete particles of a pressing adjuvant, and discrete particles of other refractory compounds if used, having an average size of less than a micron, are homogeneously interdispersed as a co-continuous phase with a three-dimensional network of molybdenum, tungsten, chromium, rhenium, iron, cobalt, nickel, or their alloys so that the uniformity of distribution is on a scale of less than 100 square microns. The average size of the metal crystals in the composite is less than one micron and continuity of the metal is such that the composite has an electrical resistivity of less than one ohm cm. The amount of silicon nitride, and other refractory compounds if used, is from 3 to 50 parts by volume per part of metal when the metal is iron, cobalt or nickel, and from 1.5 to 19 parts by volume per part of metal when the metal is molybdenum, tungsten, chromium, or rhenium. The amount of pressing adjuvant is from 0.06 to 7 parts by volume per part of metal, and the density of the composite is in excess of 99% of the theoretical density. The most preferred metals for such a composite are molybdenum, tungsten, cobalt and an alloy of nickel with 15 weight percent molybdenum, and the preferred pressing adjuvants are magnesium nitride, lithium nitride, and magnesium oxide.

The refractory interdispersions of this invention are hard, strong, thermal shock-resistant and corrosion-resistant. They display high electrical and thermal conductivity and demonstrate superior resistance to erosion. These properties make them particularly useful for structural applications, for corrosion and erosion-resistant chemical process equipment, for high temperature electrodes, for dies, thread guides, bearings and seals.

However, as stated before, the refractory interdispersions of this invention are most particularly useful as tool bits in cutting, grinding, shaping, drilling and punching very hard metal or alloys at high speeds. This is due to their great impact strength and thermal conductivity and their unusual resistance to thermal shock, wear, cratering and welding. In addition the refractory interdispersions of this invention are most useful as tool bits in cutting, grinding, shaping, drilling and punching non-ferrous metals such as bronze, copper, brass aluminum and aluminum-silicon alloys.

In order that the invention may be better understood, the following illustrative examples are given wherein parts and percent are by weight unless otherwise noted.

Example 1

Two hundred parts of very finely divided silicon metal are prepared by ballmilling silicon metal powder having an initial particle size of about 10 microns. The resulting fine silicon powder is heated at 1360° C. for 48 hours in an alumina tube enclosed in an electric furnace under an atmosphere of ammonia gas. The ammonia flow rate maintained is about 1.25 grams per minute.

X-ray identification, along with measurements of the nitrogen surface area, indicate that the resulting product is a mixture of alpha and beta silicon nitrides, having a surface area of 2.5 m.$^2$/g., which corresponds to an average particle size of the product of 75 millimicrons. Emission spectrograph analysis shows the major impurities to be iron, aluminum, magnesium, and calcium, with the iron and aluminum being present to the extent of about 1% each, and the other materials being present in lesser quantities.

Chemical analysis shows the oxygen content to be 0.63%, the silicon content to be 59.4%, with the balance of the composition being nitrogen (other than minor amounts of iron, aluminum, and other impurities previously noted).

Electron micrographs show very fine needle-like crystals which are clumped or aggregated together into bundles approximately one to 5 microns in diameter.

Twenty-nine and seven tenths parts of this silicon nitride, 1.46 parts of a 300 millimicron particle size powder of magnesium nitride, and 1.53 parts of a 300 millimicron particle size metal powder mixture containing iron and metallic boron in the weight ratio of 99 parts of iron to one part of boron, are loaded into a rubber-lined steel ballmill which is filled to 40% of its volume with ¼″ diameter, ¼″ long cylindrical rods of tungsten carbide-6% cobalt. Also added are 260 parts of an isoparaffinic hydrocarbon oil having a flash point of 185° F.

This composition is milled for 48 hours on rubber-lined rollers, with the mill rotating at a speed of 60 r.p.m. After milling, the intimate powder interdispersion of silicon nitride, magnesium nitride, and the iron and boron metal powders are separated by filtration from the tungsten carbide-cobalt milling rods, and separated by decantation from the bulk of the hydrocarbon oil. The dispersion is then washed three times with hexane, using 1318 parts of hexane per wash, until free of residual oil, and dried in a vacuum oven overnight. This powder is then screened through a 70 mesh screen.

Chemical analysis shows it to contain 46.7 parts by volume of silicon nitride and 2.3 parts by volume of magnesium nitride per part by volume of a metal which is 99 percent iron and 1 percent boron.

Fifteen parts of this interdispersion are placed in a cylindrical carbon mold and hot pressed in an induction-heated, vacuum hot press under a pressure of 4000 p.s.i., at a top temperature of 1900° C., and with a holding time of 1 minute under these conditions. The sample is cooled, removed from the press, and cut into test pieces for evaluation of its density and mechanical properties.

Cutting is performed by a thin diamond saw blade, using a wafer-cutting machine for this purpose. It is found that the transverse rupture strength of this refractory dispersion is 51,300 p.s.i., its hardness on the Rockwell A scale is 85.2, and its impact strength is 5.1 ft.lbs./in.$^2$. Its density is 3.24 g./cc., which represents 99% of the theoretical density of 3.27 g./cc., which can be calculated for this composition assuming that the volume of the various substituents are additive.

A cutting tool insert is also machined from this refractory, and it is found to be an exceptional cutting tool on steel and cast iron, showing relatively little wear and little tendency to weld or seize to the work-pieces at cutting speeds up to 500 surface feet per minute.

Example 2

Twenty-seven and sixteen hundredths parts of the silicon nitride of Example 1, 1.46 parts of magnesium nitride finely divided powder, 7.8 parts of finely divided tungsten carbide powder, and 4.4 parts of a finely divided metal powder mixture containing 99.5 percent cobalt and 0.5 percent boron metal powders, are mixed and milled as described in Example 1. Recovery from the mill, purification, and drying of this intimate powder interdispersion is also effected as described in Example 1.

Chemical analysis of the powder dispersion shows it to contain about 17.1 parts by volume of silicon nitride, about 0.9 part by volume magnesium nitride, and 1.0 part by volume of tungsten carbide per part by volume of a metal which is 99.5 percent cobalt and 0.5 percent boron.

Eighteen parts of this dispersion are pressed as described in Example 1, with the exception that the temperature is 1800° C., and the holding time at top temperature is 5 minutes.

The resulting refractory interdispersion of the invention has a density of 3.88 g./cc., which represents 95% of the theoretical density of 4.08 g./cc. to be expected for this composition.

The transverse rupture strength of the interdispersion is 48,700 p.s.i., its Rockwell A hardness is 85.0, and its impact strength is 5.4 ft.lbs./in.$^2$. This refractory interdispersion is useful as an oxidation-resistant, high temperature structural material.

Example 3

Twenty-seven and three hundredths parts of the silicon nitride of Example 1, 1.59 parts of finely divided magnesium nitride, and 8.68 parts of a finely divided metal powder mixture of 99 percent nickel and 1 percent boron metal powders are mixed. They are milled, recovered from the mill, purified, and dried as described in Example 1. Seventeen parts of this interdispersion are hot pressed as described in Example 1, with the exception that the pressure employed is 500 p.s.i., the temperature is 1650° C., and the holding time under these conditions is 15 minutes.

The resulting refractory interdispersion of the invention contains 8.5 parts by volume silicon nitride and 0.5 part by volume magnesium nitride per part by volume of a metal, which is an alloy of nickel and boron in the weight ratio of 99 parts of nickel to one of boron.

The density of this refractory is found to be 3.58 g./cc., which represents 96% of the theoretical density of 3.73 g./cc. This refractory has a transverse rupture strength of 50,800 p.s.i., an impact strength of 6.4 ft.lbs./in.$^2$, and a Rockwell A hardness of 82.0.

Example 4

Twenty-five and fifty-seven hundredths parts of the silicon nitride of Example 1, 1.46 parts of magnesium nitride powder, and 13.34 parts of a metal powder mixture which is a 50-50 mixture of nickel and cobalt finely divided metal powders, are milled, recovered from the mill, purified, and dried, as described in Example 1.

Eighteen parts of the resulting interdispersion are hot pressed under the following conditions: the pressure is 6000 p.s.i., the temperature is 1300° C., and the holding time at top temperature is 30 minutes.

The resulting refractory interdispersion is found to contain about 5.4 parts by volume silicon nitride and about 0.3 part by volume of magnesium nitride per part by volume of a 50-50 alloy of cobalt and nickel.

The density of this refractory is 3.76 g./cc., which is 93% of the 4.04 g./cc., which can be theoretically expected of it.

The transverse rupture strength of this refractory is 48,400 p.s.i., its impact strength is 6.6 ft.lbs./in.$^2$, and its hardness on the Rockwell A scale is 74.3.

Example 5

Fifteen and nine-tenths parts of the silicon nitride of Example 1, 4.0 parts of a 300 millimicron powder of alpha alumina, 4.89 parts of a finely divided aluminum nitride powder, 9.85 parts of finely divided iron powder, and 11.11 parts of finely divided cobalt metal powder are milled as described in Example 1. The powder interdispersion is recovered and purified as described in Example 1 also.

Twenty-seven parts of this interdispersion are pressed at a temperature of 1350° C., a pressure of 6000 p.s.i., and using a 30 minute hold time under these conditions.

The resulting refractory interdispersion of the invention consists of 2 parts by volume of silicon nitride, 0.4 part by volume of alumina, and 0.6 part by volume of aluminum nitride per part by volume of an alloy which is 50 volume percent iron and 50 volume percent cobalt.

The density of this refractory is 4.30 g./cc., which is 94% of the 4.57 g./cc. theoretically expected of it.

The transverse rupture strength of this refractory is 54,300 p.s.i., its Rockwell A hardness is 75.0, and its impact strength is 8.6 ft.lbs./in.$^2$.

Example 6

Sixteen and six-hundredths parts of the silicon nitride of Example 1, 1.43 parts of finely divided magnesium nitride powder, 21.2 parts of less than 10 micron particle size iron powder, and 16.0 parts of less than 10 micron size nickel metal powder are mixed and milled as described in Example 1. Recovery and purification is also as directed in that example.

Twenty-five parts of this intimate powder interdispersion are pressed at room temperature under a pressure of 10,000 p.s.i. in a hardened steel die to form a green billet. The billet is then sintered under vacuum at 1100° C. for a period of 4 hours, which gives an approximately 65% dense, fairly strong billet. This billet is enclosed in a cap of stainless steel having the composition 74% iron, 18% chromium, and 8% nickel. The can is sealed and the canned billet rapidly inserted into a high pressure press, after first being heated to approximately 1250° C. Immediately upon insertion, a pressure of 100,000 p.s.i. is applied, and in a period of from 1 to 5 seconds, the extrusion of this composition is completed. The die employed is a hardened steel die having a 4 to 1 diameter reduction ratio.

The resulting refractory interdispersion of the invention consists of about 1.1 parts by volume silicon nitride, and about 0.1 part by volume magnesium nitride per part by volume of an alloy of 60 volume percent iron and 40 volume percent nickel.

The density of this composition is 5.47 g./cc., which is the theoretical density expected of it.

The refractory interdispersion has a rupture strength of 80,000 p.s.i., a Rockwell A hardness of 86.4, and an impact strength of 15.3 ft.lbs./in.$^2$. This refractory is useful as a drawing die for copper wire, showing relatively little tendency to wear, seize, or gall even at relatively high drawing speeds.

Example 7

Nineteen and seventy-two hundredths parts of the silicon nitride of Example 1, 1.43 parts of magnesium nitride powder, 14.05 parts of a 10 micron particle size powder of titanium monoxide, 2.66 parts of finely divided iron metal powder, and 1.14 parts of finely divided chromium metal powder are mixed. They are milled as described in Example 1, and the powder is recovered and purified as described in that example also.

Twenty parts of this powder are hot pressed in a cylindrical carbon mold at a temperature of 1900° C., under a pressure of 4000 p.s.i., holding these conditions for 1 minute. The resulting refractory interdispersion contains 12.4 parts by volume of silicon nitride, 0.9 part by volume of magnesium nitride and 5.7 parts by volume of titanium monoxide per part by volume of an alloy which is 70 percent iron and 30 percent chromium.

This refractory interdispersion has a density of 3.82 g./cc., which represents 98% of the theoretical density of 3.90 g./cc.

The transverse rupture strength of this composition is 52,600 p.s.i., its Rockwell A hardness is 89.0, and its impact strength is 5.8 ft.lbs./in.$^2$. This refractory is an excellent cutting tool both on steel and cast iron, showing very little wear, cratering or welding, even at relatively high cutting speeds.

Example 8

Seventeen and seventeen-hundredths parts of the silicon nitride of Example 1, 1.43 parts of magnesium nitride, and 17.1 parts of a 1 micron particle size powder of titanium nitride, 6.76 parts of a finely divided nickel metal powder and 1.69 parts of a finely divided chromium metal powder are mixed together. They are milled, recovered from the mill, purified, and dried as described in Example 1.

Twenty parts of this dispersion are pressed in a hardened steel mold, under a pressure of 10,000 p.s.i., to give a green billet. This billet is sintered for 4 hours at a temperature of 1325° C. in an alumina tube maintained under a high vacuum.

The resulting refractory interdispersion of the invention contains 3.4 parts by volume of silicon nitride, 0.45 part by volume of magnesium nitride and about 3.2 parts by volume of titanium nitride per part by volume of an alloy which is 80 percent nickel and 20 percent chromium.

The density of this composition is 5.38 g./cc., which is 99.5% of the theoretical density of 5.94 g./cc.

The rupture strength of this refractory is 63,000 p.s.i., its hardness is 65.7 on the Rockwell A scale, and its impact strength is 11.1 ft.lbs./in.$^2$.

Example 9

Ten and eighteen-hundredths parts of silicon nitride, 0.6 parts of lithium nitride, 23.40 parts of tungsten carbide, 30.8 parts of finely divided nickel metal power, and 5.44 parts of finely divided chromium metal powder are mixed, milled, recovered from the mill, purified, and dried, as directed in Example 1.

Thirty parts of this interdispersion are hot pressed in a 1″ diameter cylindrical carbon mold at 1400° C., using a pressure of 4000 p.s.i., and a holding time of 30 minutes. The resulting refractory interdispersion consists of about 1.1 parts by volume of silicon nitride, about 0.8 part by volume of lithium nitride, and about 0.4 part by volume of tungsten carbide per part by volume of an 85 percent nickel, 15 percent molybdenum alloy.

The density of this refractory is 6.62 g./cc., which is

94% of the 7.04 g./cc., expected for this composition theoretically.

The transverse rupture strength is 64,000 p.s.i., the Rockwell A hardness is 68.3, and the impact strength is 11.2 ft.lbs./in.²

Example 10

Twelve and eight-hundredths parts of the silicon nitride of Example 1, 0.3 part of anhydrous powdered magnesium orthoborate, 18.3 parts of finely divided zirconium nitride powder, 33.4 parts of cobalt metal powder, and 5.9 parts of finely divided tungsten metal powder are mixed, milled, recovered and purified as directed in previous examples. Twelve parts of this interdispersion are pressed into a hardened steel die under a pressure of 10,000 p.s.i. The resulting green billet is then inserted in an alumina tube in an electric furnace, and heated to 1600° C., under high vacuum, and held at this temperature for one hour.

The resulting refractory interdispersion of the invention consists of about 1.1 parts by volume of silicon nitride, about 0.3 part by volume of magnesium borate and about 0.7 part by volume of zirconium nitride per part by volume of a cobalt-tungsten alloy which has a composition of 85 percent cobalt and 15 percent tungsten.

The density of this refractory interdispersion is 6.44 g./cc., which is 92% of the theoretical density of 7.0 g./cc. expected of this composition. Its rupture strength is 55,500 p.s.i., its Rockwell A hardness is 68.8, and its impact strength is 10 ft.lbs./in.²

Example 11

Twenty-six and eighty-two hundredths parts of the silicon nitride of Example 1, 2.15 parts of finely divided magnesium oxide powder, 4.94 parts of colloidal thoria powder having a particle size of approximately 16 millimicrons, and the following amounts of finely divided metal powders: 3.04 parts of cobalt, 0.87 part of chromium, 0.43 part of tungsten, and 0.04 part of boron, are milled and recovered, purified and dried, as directed in Example 1.

Eighteen parts of the resulting intimate powder dispersion of the various metals and the silicon nitride and thoria are hot pressed at a temperature of 1750° C. under 4000 p.s.i. pressure, and held under these conditions for a period of one minute.

The resulting refractory interdispersion contains about 16.9 parts by volume of silicon nitride, 1.2 parts by volume of magnesium oxide and about 0.9 part by volume of thoria per part by volume of a complex alloy which contains 69% cobalt, 20% chromium, 10% tungsten, and 1% boron.

The density of this refractory interdispersion is 3.81 g./cc., which is 99.5% of the theoretical 3.83 g./cc. to be expected of this composition.

The transverse rupture strength is 70,000 p.s.i., its Rockwell A hardness is 92.5, and its impact strength is 6.2 ft.lbs./in.² This refractory is a good cutting tool for cast iron and steel, as well as bronze, copper, brass, and aluminum.

Example 12

Twenty-seven and three-hundredths parts of the silicon nitride of Example 1, 4.00 parts of a 300 millimicron particle size alpha alumina powder, 3.67 parts of finely divided iron metal powder, 0.4 part of a high surface area carbon black, and 0.04 part of finely divided metallic boron are milled as described in previous examples. Following recovery, purification, and drying as previously described, 17 parts of the resultant powder are pressed at a temperature of 1900° C. under a pressure of 4000 p.s.i., using a holding time of 5 minutes.

The resulting refractory interdispersion of the invention contains 17.0 parts by volume silicon nitride and 2.0 parts by volume alumina per part by volume of an alloy of 98% iron, 1 percent carbon, and 1 percent boron.

The density of this composition is 3.48 g./cc., which is the theoretical density expected of it.

Its transverse rupture strength is 80,000 p.s.i., its Rockwell A hardness is 92, and its impact strength is 7.0 ft.lbs./in.²

Example 13

Twenty-six and eight hundredths parts of the silicon nitride of Example 1, 2.88 parts of magnesium aluminate spinel finely divided powder, 7.6 parts of finely divided nickel metal powder, and 0.4 part of finely divided aluminum metal flake are mixed, milled, recovered, purified and dried as described in Example 1.

Twenty parts of this dispersion are hot pressed at a temperature of 1900° C., under a pressure of 4000 p.s.i., and using a holding time of five minutes.

The resulting refractory interdispersion is composed of 8.2 parts by volume of silicon nitride and 0.8 part by volume of magnesium aluminate per part by volume of a nickel-aluminum alloy having the proportions of 95% nickel to 5% aluminum. The density of this composition is 3.70 g./cc., which is the theoretical density expected of it.

Its transverse rupture strength is 69,000 p.s.i., its hardness on the Rockwell A scale is 91.5, its impact strength is 7.5 ft.lbs./in.² This refractory is an excellent cutting tool for ferrous metals, aluminum, copper, and bronze, showing very little wear even at high speeds of operation. In particular, it is highly resistant to welding and cratering.

Metallographic examination of this refractory shows an interdispersion of silicon nitride and magnesium aluminate in a nickel-aluminum alloy. The average particle size of the metal crystals ranges from about 0.4 to about 0.8 micron and the average particle sizes of the silicon nitride and magnesium aluminate are about 0.5 and 0.7 micron.

The metallographic examination of this interdispersion further shows that the silicon nitride, the magnesium aluminate and the nickel-aluminum alloy are all present within a square region ten microns on edge, and of ten such one hundred square micron regions examined, nine exhibit these same structural characteristics.

The electrical resistivity of this refractory interdispersion is about one ohm centimeter. This low value of electrical resistivity indicates that the continuity of the metal in this interdispersion is not interrupted by silicon nitride of magnesium aluminate.

Example 14

Silicon metal powder of a —325 mesh particle size is nitrided as described in Example 1, and the resulting approximately 50 micron size silicon nitride is ballmilled until the average particle size is 10 microns. Sixty-four parts of this silicon nitride powder are mixed with 1.6 parts of a commercially available 20 millimicron, anhydrous, spherical, gamma alumina powder, and 178 parts of approximately 50 millimicron particle size nickel powder produced by extensive ballmilling with nickel balls, of commercially available, approximately 1 micron size, carbonyl nickel powder. The resulting mixture is milled for 500 hours using nickel shot and milling under a high boiling hydrocarbon oil. Milling is performed in a steel mill filled to 40% of capacity with the nickel shot, and containing enough of the high boiling hydrocarbon oil to cover the nickel balls and powder. Recovery of the powder, its purification, and drying is performed as described in previous examples.

Twenty-four parts of this powder are fabricated by cold pressing, sintering and extruding, as described in Example 6. The resulting dense body of the invention consists of an interdispersion of 1 part by volume of silicon nitride in 1 part by volume of a continuous phase of nickel metal in which was also dispersed .02 part by volume per part of metal of alumina as a pressing adjuvant. The density of this composition is 6.03 g./cc.

Example 15

Two hundred and forty parts of silicon nitride are prepared as described in Example 14, with the omission of the ballmilling operation. Forty parts of the alumina powder described in that example, 6.23 parts of a −325 mesh nickel powder, and 2.16 parts of a −325 mesh chromium powder are milled with the silicon nitride as described in Example 14. Purification, recovery from the mill, and drying is also performed as described in previous examples.

Twenty-four parts of this material are hot pressed at a temperature of 1850° C. in a carbon mold using a pressure of 6000 p.s.i. After cooling the furnace and removing the product, it is found to consist of an interdispersion of 75 parts by volume of silicon nitride and 10 parts by volume of alumina, with one part by volume of a nickel-chromium alloy containing about 26 percent chromium and 74 percent nickel. The density is 3.35 g./cc., which is the theoretical density expected for it. This material is a useful high temperature structural material, and, in addition, is a good cutting tool at relatively high speeds on steel and cast iron.

Example 16

The procedure described in Example 15 is repeated, the same quantities of materials are used except that 316.8 parts of the 40–50 micron particle size silicon nitride is employed instead of the 240 parts cited in the previous example. Hot pressing is performed as described above, and the resulting refractory interdispersion of the invention consists of 99 parts by volume of silicon nitride and 10 parts by volume of alumina for each part by volume of metal binder. The metal binder has a composition of 26 percent chromium and 74 percent nickel. The density of the interdispersion is found to be 3.21 g./cc., which is approximately the theoretical density to be expected of it. This sample shows good wear resistance in cutting tool applications, particularly at high speeds and when using light cuts.

Example 17

Thirty-one parts of silicon nitride powder of Example 1, 1.4 parts of a −10 micron particle size powder of magnesium nitride, and 5.0 parts of finely divided molybdenum metal powder having a particle size of less than 10 microns, are loaded into a rubber-lined steel ballmill which is filled to 40% of its volume with ¼" diameter, ¼" long cylindrical rods of tungsten carbide-6% cobalt, and 260 parts of an isoparaffinic hydrocarbon oil having a flash point of 185° F.

This composition is milled for 14 hours on rubber-lined rollers with the mill rotating at a speed of 60 r.p.m.

After milling, the intimate powder interdispersion of molybdenum metal, silicon nitride and magnesium nitride is separated by filtration from the tungsten carbide-cobalt milling rods, and separated by decantation from the bulk of the hydrocarbon oil. It is then washed three times with hexane, using 1318 parts of hexane per wash, until free of residual oil, and dried in a vacuum oven overnight. This dispersion is screened through a 70 mesh screen.

Chemical analysis shows it to consist of about 21.9 parts by volume silicon nitride, about 1.1 parts by volume magnesium nitride, and about 0.2 part by volume tungsten carbide per part by volume of a metal which is about 97.6 volume percent molybdenum and about 2.4 volume percent cobalt. The tungsten carbide and cobalt presumably results from the attrition of the milling rods during the milling operation.

Fifteen parts of this material are loaded into a 1" diameter carbon mold, and pressed in an induction-heated, vacuum hot press using a pressure of 4000 p.s.i., which is first applied at a temperature of 1000° C., with the final temperature being raised while still maintaining the pressure, to a temperature of 1850° C., and held at this point for 5 minutes thereafter.

The sample is cooled and the resulting refractory interdispersion of the invention is cut up into bars suitable in dimension for determining their mechanical properties and density. The transverse rupture strength of this refractory is found to be 60,100 p.s.i., and its impact strength is 3.9 ft.lbs./in.$^2$. Its density is 3.65 g./cc., which is substantially the theoretical density to be expected for this composition, assuming that the volume of the various constituents are additive.

This refractory is useful as a high temperature structural material, showing excellent oxidation resistance and strength, coupled with a high thermal shock resistance even in oxidizing environments, and at temperatures ranging as high as 1200 to 1400° C.

Example 18

Thirty-one parts of the silicon nitride of Example 1, 1.4 parts of magnesium nitride, and 3.6 parts of finely divided chromium metal powder having a particle size smaller than 10 microns, are loaded together and milled as described in Example 17. The milling times and conditions, as well as the equipment and milling media, are identical with those described in Example 17. Recovery of the resulting silicon nitride, magnesium nitride, chromium intimate powder interdispersion is effected also as described in Example 17.

Chemical analysis of this interdispersion shows it to contain about 18.6 parts by volume silicon nitride, about 1.0 part by volume magnesium nitride, and about 0.3 part by volume tungsten carbide per part by volume of a metal which is about 95.8 percent by volume chromium and about 4.2 percent by volume cobalt.

Seventeen parts of this interdispersion are pressed in a vacuum induction heated hot press, using the conditions described in Example 17, except that the top temperature is 1750° C., rather than 1850° C.

After cooling and cutting up the resulting refractory interdispersion of the invention to test its properties, the following values are obtained: The transverse rupture strength is 63,900 p.s.i., the impact strength is 3.4 ft.lbs./in.$^2$, the Rockwell A hardness is 90.2, and the density is 3.50 g./cc., which is 99.5% of the theoretical density to be expected for this composition.

This refractory is a useful cutting tool on steel and on cast iron, showing relatively little flank wear and cratering at cutting speeds ranging up to 340 surface feet per minute, and depths of cut of ⅟₁₆ inch.

Example 19

Thirty-one parts of the silicon nitride of Example 1, 1.4 parts of magnesium nitride, and 9.6 parts of tungsten metal powder are milled, and recovered from the mill as described in Example 17. Chemical analysis of the resulting intimately mixed interdispersion shows it to consist of about 19.1 parts by volume silicon nitride, about 1.0 part by volume magnesium nitride, and about 0.2 part by volume tungsten carbide per part by volume of a metal which is about 97.9 percent by volume tungsten and about 2.1 percent by volume cobalt.

Sixteen parts of this interdispersion are pressed as described in Example 17 and the resulting refractory interdispersion shows the following properties: transverse rupture strength is 54,600 p.s.i., impact strength is 1.1 ft.lbs./in.$^2$, and the Rockwell A hardness is 90.85. The density is 4.05 g./cc., which is substantially the theoretical density to be expected for this composition.

This refractory is a useful cutting tool on cast iron, steel, copper, bronzze, and aluminum.

Example 20

Thirty-one parts of the silicon nitride of Example 1, 1.4 parts of finely divided magnesium nitride, and 5.1 parts of finely divided molybdenum metal powder are mixed and milled as described in Example 17, with the exception that ⅜" steel balls are employed as the grinding media rather than the tungsten carbide-cobalt rods previously used. Recovery from the mill, purification, and drying are as described in Example 17. Chemical analyses show the resulting powder consists of about 12.4 parts by volume silicon nitride, and about 0.6 part by volume magnesium nitride per part by volume of a metal which is about 63.4 volume percent molybdenum and about 36.6 volume percent iron. Twenty-three parts of this interdispersion are hot pressed as described in Example 17, and the resulting refractory interdispersion is cut up into test specimens for characterization of its mechanical properties.

The transverse rupture strength of this refractory is 60,750 p.s.i., its impact strength is 3.3 ft. lbs./in.$^2$, and its Rockwell A hardness is 90.1. The density is 3.61 g./cc., which is the theoretical density expected for it.

Example 21

Thirty-one parts of the silicon nitride of Example 1, 1.4 parts of finely divided magnesium nitride powder, and 3.6 parts of finely divided chromium metal powder are milled, purified and dried as described in the previous example. Chemical analysis shows the resulting intimately mixed powder to contain about 12.5 parts by volume of silicon nitride and about 0.6 part by volume of magnesium nitride per part by volume of a metal which is about 63.4 volume percent molybdenum and about 36.6 volume percent iron.

This interdispersion is hot pressed as described in Example 18, and the resulting refractory interdispersion of the invention is characterized in regard to mechanical properties and density.

The average transverse rupture strength is 43,850 p.s.i., its impact strength is 3.7 ft. lbs./in.$^2$, and its Rockwell A hardness is 90.2. Its density is 3.45 g./cc., representing 99.2% of the theoretical density expected for this composition.

Example 22

Thirty-one parts of the silicon nitride of Example 1, 1.4 parts of finely divided magnesium nitride powder, and 9.6 parts of finely divided tungsten metal powder are mixed and milled as described in Example 20. Recovery, purification and drying are as described in previous examples.

Chemical analysis shows the resulting intimately mixed powders to contain about 11.4 parts by volume of silicon nitride and about 0.6 part by volume of magnesium nitride per part by volume of a metal which is about 58.4 volume percent tungsten and about 41.6 volume percent iron. Sixteen parts of this interdispersion are pressed as described in Example 17, and the resulting refractory interdispersion has the following properties: its transverse rupture strength is 42,500 p.s.i., its impact strength is 2.2 ft. lbs./in.$^2$, and its Rockwell A hardness is 90.1. Its density is 4.03 g./cc., representing 99.8% of the theoretical density for this composition.

Example 23

Eleven and seventy-seven hundredths parts of the silicon nitride of Example 1, 0.6 part of lithium nitride, 6.52 parts of aluminum nitride, 52.11 parts of tungsten metal, and 1.35 parts of titanium hydride are milled, using the equipment and conditions described in Example 17. Recovery, purification, and drying, is also effected as described in Example 17. Chemical analysis shows the resulting fine powder interdispersion to contain about 1.23 parts by volume silicon nitride, about 0.1 part by volume lithium nitride, and about 0.67 part by volume aluminum nitride per part by volume of a metal which is 90 volume percent tungsten and 10 volume percent titanium.

Twenty-eight parts of this interdispersion are hot pressed as described in Example 17, except that the top temperature is 1900° C., and the holding time 3 minutes. The resulting refractory interdispersion of the invention has a rupture strength of 120,000 p.s.i., an impact strength of 11 ft. lbs./in.$^2$, and a Rockwell A hardness of 88.7. Its density is 7.20 g./cc., which is 99.5% of the theoretical density of 7.23 g./cc. This refractory is an excellent cutting tool on steel and cast iron.

Example 24

Fifteen and fifty-eight hundredths parts of the silicon nitride of Example 1, 0.29 part of magnesium orthoborate, 10.0 parts of alumina, 24.99 parts of finely divided molybdenum metal, and 0.32 part of zirconium hydride are milled, using the conditions and equipment described in Example 17. The resulting mixture is shown by chemical analysis to contain about 1.96 parts by volume silicon nitride, 0.4 part by volume magnesium orthoborate and 1.0 part by volume alumina per part by volume of a metal which is 98 volume percent molybdenum and 2 volume percent zirconium.

Twenty parts of this composition are hot pressed as described in Example 17, except that the pressure employed is 6000 p.s.i., and the holding time at 1850° C. is 4 minutes.

The resulting dense body of the invention has a transverse rupture strength of 83,000 p.s.i., an impact strength of 9 ft. lbs./in.$^2$, and a Rockwell A hardness of 88.3. Its density is 4.71 g./cc., which represents 92.0% of the theoretical density of 5.12 g./cc. to be expected of this composition.

Example 25

Thirteen and ninety-nine hundredths parts of the silicon nitride of Example 1, 2.15 parts of finely divided magnesium oxide powder, 16.2 parts of finely divided titanium nitride powder, 19.3 parts of finely divided tungsten metal powder, and 10.2 parts of finely divided molybdenum metal powder are mixed and milled as described in Example 17. Recovery from the mill, purification, and drying are also effected as described in Example 17.

Chemical analysis shows this composition to contain 2.2 parts by volume silicon nitride, 1.5 parts by volume titanium nitride, and 0.3 part by volume magnesium nitride per part by volume of a metal which is 50 volume percent molybdenum and 50 volume percent tungsten.

Twenty-five parts of this interdispersion are hot pressed at a temperature of 1900° C., a pressure of 5000 p.s.i., and a holding time of one minute.

The resulting refractory interdispersion has a transverse rupture strength of 81,000 p.s.i., an impact strength of 6.0 ft.lbs./in.$^2$, and a Rockwell A hardness of 90.0. Its density is 6.19 g./cc., which is the theoretical density for this composition.

Example 26

Nineteen and eight hundredths parts of silicon nitride, 4.00 parts of a 300 millimicron particle size alumina powder, 7.29 parts of finely divided titanium carbide, and 10.65 parts of finely divided chromium metal, are milled as described in Example 17. Recovery from the mill, purification, and drying, are effected as described in Example 17 also. Chemical analysis shows that the resulting finely divided interdispersion contains 4.0 parts by volume silicon nitride, 1.0 part by volume titanium carbide, and about 0.7 part by volume alumina per part by volume of chromium.

Sixteen parts of this interdispersion are hot pressed at a temperature of 1600° C., using a pressure of 6000 p.s.i., with a holding time of 30 minutes.

The resulting refractory interdispersion of the invention has a transverse rupture strength of 67,000 p.s.i., an impact strength of 5.0 ft.lbs./in.$^2$, and a Rockwell A hardness of 90.0. Its density is 3.90 g./cc., which is 95% of the theoretical density of 4.11 g./cc. of this composition.

Example 27

Eleven and seventy-seven hundredths parts of the silicon nitride of Example 1, 2.88 parts of a finely divided powder of magnesium aluminate spinel, 17.65 parts of finely divided powdered zirconium nitride, 40.53 parts of finely divided tungsten metal powder, and 18.9 parts of finely divided rhenium metal powder are milled as described in Example 17. Recovery, purification, and drying are also described in Example 17.

Chemical analysis shows the interdispersion to contain about 1.23 parts by volume silicon nitride, about 0.83 part by volume zirconium nitride, and about 0.27 part by volume of magnesium aluminate per part by volume of a metal which is 70 volume percent tungsten and 30 volume percent rhenium.

Thirty-six parts of this interdispersion are pressed, using a pressure of 500 p.s.i., a temperature of 1850° C., and a holding time of 15 minutes.

The resulting refractory interdispersion has a transverse rupture strength of 125,000 p.s.i., an impact strength of 16.0 ft.lb./in.$^2$, and a Rockwell A hardness of 88.7. Its density is 9.17 g./cc., which is 100% of the theoretical density to be expected for this composition.

Example 28

One thousand, three hundred and sixty parts of −325 mesh molybdenum metal powder is placed in a steel ball-mill filled to 40% of its volume with steel balls, and also containing 1400 parts of a high boiling hydrocarbon oil. This is milled at a speed of 30 r.p.m. for 3 days, after which the molybdenum powder is separated from the hydrocarbon oil and from the steel balls, washed thoroughly with hexane to remove residual oil, and dried in a vacuum oven. It is treated with a mixture of 1,190 parts of concentrated hydrochloric acid and 1500 parts of distilled water, and heated for 1 hr. at 90° C. This is done to dissolve iron picked up during the milling operation. It is allowed to remain stirring with the hydrochloric acid-water mixture overnight. It is then centrifuged to recover the molybdenum and to separate this from the dissolved iron which had been removed by acid treatment, and is washed with 0.1 N HCl solution until free of iron. This requires 5 washes. It is then further washed with distilled water until free of chloride ion, and dried in a vacuum oven.

The resulting finely divided molybdenum metal powder has an average particle size of from 100 to 200 millimicrons, and contains only traces of iron as an impurity.

Sixty-four parts of the silicon nitride of Example 1, 204 parts of this molybdenum metal powder, and 1.6 parts of a commercially available 20 millimicron, anhydrous, spherical gamma alumina powder, are mixed and milled in a steel mill, using ¼″ molybdenum rod inserts as the grinding media. The mill is filled to 40% of its volume with the molybdenum rod inserts and is covered with a high boiling hydrocarbon oil in sufficient quantity to cover the molybdenum inserts and the metal, silicon nitride and alumina powders.

After milling for 48 hours, the resulting intimately mixed powdered interdispersion of the invention is recovered as previously described in other examples. Forty parts of this material is hot pressed at a temperature of 1850° C. under a pressure of 4000 p.s.i. and employing a holding time of 5 minutes under these conditions.

The resulting refractory of the invention consists of an interdispersion of 1 part of colloidal silicon nitride and a two hundredth part of colloidal alumina with a continuous matrix of one part of molybdenum metal. The density is the theoretical density of 6.64 g./cc. This refractory is an excellent high temperature structural material, combining good impact strength with high thermal shock resistance and relatively satisfactory oxidation resistance.

Metallographic examination of this refractory shows an interdispersion of silicon nitride and alumina in molybdenum metal. The average particle size of the molybdenum crystals ranges from about 0.4 to 0.8 micron and the average particle size of the silicon nitride and alumina is about 0.5 micron.

The metallographic examination of this interdispersion further shows that the silicon nitride, the alumina and the molybdenum are all present within a square region ten microns on edge, and of ten such one hundred square micron regions examined, nine exhibit these same structural characteristics.

The electrical resistivity of this refractory interdispersion is about one ohm centimeter. This low value of electrical resistivity indicates that the continuity of the molybdenum in this interdispersion is not interrupted by silicon nitride or alumina.

Example 29

A silicon metal powder having a −325 mesh particle size is nitrided as described in Example 1 and the resulting, approximately 50 micron silicon nitride is mixed in the proportions of 240 parts of this silicon nitride powder with 40 parts of the alumina described in the previous example, and 19.2 parts of a −325 mesh tungsten powder. This is milled as described in the previous example, except that tungsten rod inserts are used instead of molybdenum inserts.

Purification, drying and hot pressing are done in a similar fashion to that of Example 28. The resulting refractory interdispersion of the invention consists of 75 parts by volume silicon nitride and 10 parts by volume alumina per part by volume of tungsten metal. The density of this interdispersion is 3.48 g./cc., which is theoretical density to be expected of this composition. This refractory is quite useful as a cutting tool at surface speeds up to 500 feet per minute on steel and cast iron.

Example 30

Three hundred and fourteen and six-tenths parts of the silicon nitride of the previous example, 40 parts of the alumina of Example 28, and 19.2 parts of −325 mesh tungsten metal powder are milled as described in Example 28, except for the substitution of tungsten rods for molybdenum rods. Hot pressing is as performed in Examples 28 and 29. The resulting dense composition of the invention consists of 98 parts of silicon nitride and 10 parts of alumina interdispersed with one part of tungsten metal. The density of this composition is 3.43 g./cc., which is close to the theoretical density to be expected from it. This refractory is a useful cutting tool and high temperature refractory material.

I claim:
1. A dense, homogeneous interdisposition consisting essentially of
   (a) from 1 to 99 parts by volume of silicon nitride,
   (b) from 0.02 to 10 parts by volume of a second compound selected from the group consisting of magnesium nitride, lithium nitride, alumina, magnesium oxide, silica, boric oxide and the oxide spinels which consist of a divalent oxide selected from the group consisting of magnesium oxide, iron oxide, cobalt oxide, and nickel oxide, when present in conjunction with a trivalent oxide selected from the group consisting of aluminum oxide, iron oxide and chromium oxide, with the limitation that the divalent and trivalent oxide cannot be of the same metal, and
   (c) 1 part by volume of a binder metal selected from the group consisting of iron, cobalt, nickel, chromium, rhenium, tungsten, molybdenum, their alloys with each other, and their alloys with minor amounts of a metal selected from the group consisting of manganese, aluminum, titanium, boron, silicon, carbon and zirconium,
provided that up to one-half of the volume of silicon nitride can be replaced by a refractory compound selected from the group consisting of the nitrides of aluminum, uranium, titanium, zirconium, tantalum, hafnium, boron, beryllium, cerium and thorium, the carbides of titanium, zirconium, tungsten, molybdenum, chromium, tantalum, niobium and hafnium, the aluminates and chromites of zirconium, magnesium, calcium, barium and strontium, the silicides and disilicides of chromium, molybdenum and tungsten, the oxides of zirconium, hafnium, titanium, chromium, berryllium, zinc, calcium, thorium, barium, strontium, cerium, and the rare earths, and mixtures of any of these, with the limitation that silicon nitride must always be present in an amount compromising at least 50% by volume of the non-metal components; the interdispersion being further characterized by a density of at least 98% of its theoretical density and an average grain size of its components of less than 10 microns.

2. An interdispersion of claim 1 in which both the binder metal and the silicon nitride are present as continuous, interconnecting three-dimensional networks.

3. An interdispersion of claim 1 in which the silicon nitride is present in amounts of 3 to 50 parts by volume and the binder metal is selected from the group consisting of iron, cobalt, nickel and their alloys.

4. An interdispersion of claim 1 in which the silicon nitride is present in amounts of 1.5 to 19 parts by volume and the binder metal is selected from the group consisting of molybdenum, tungsten, chromium, rhenium and their alloys.

5. An interdispersion of claim 1 in which the second compound is present in an amount ranging from 0.06 to 7 parts by volume.

6. An interdispersion of claim 3 in which the binder metal is selected from the group consisting of cobalt and alloys of nickel with minor amounts of molybdenum.

7. An interdispersion of claim 4 in which the binder metal is selected from the group consisting of molybdenum and tungsten.

8. An interdispersion of claim 6 in which both the binder metal and silicon nitride are present as continuous, interconnecting, three-dimensional networks.

9. An interdispersion of claim 7 in which both the binder metal and silicon nitride are present as continuous, interconnecting three-dimensional networks.

References Cited

UNITED STATES PATENTS

| | | | |
|---|---|---|---|
| 2,750,268 | 6/1956 | Erasmus et al. | 106—44 X |
| 2,823,988 | 2/1958 | Grant et al. | 29—182.5 X |
| 2,852,367 | 9/1958 | Goetzel et al. | 29—182.5 X |
| 3,110,091 | 11/1963 | Little et al. | 29—182.5 |
| 3,110,590 | 11/1963 | Little | 75—205 X |
| 3,128,541 | 4/1964 | Bechtold et al. | 29—182.5 |
| 3,161,949 | 12/1964 | Dickinson et al. | 29—182.5 |
| 3,262,761 | 7/1966 | Bechtold | 29—182.5 |

BENJAMIN R. PADGETT, *Primary Examiner.*

MELVIN J. SCOLNICK, *Assistant Examiner.*